(12) United States Patent
Patel

(10) Patent No.: US 8,998,519 B2
(45) Date of Patent: Apr. 7, 2015

(54) PROCESS AND FORMULATION FOR A PLASTIC PENCIL

(71) Applicant: Hemant Patel, Somerset, NJ (US)

(72) Inventor: Hemant Patel, Somerset, NJ (US)

(*) Notice: Subject to any disclaimer, the term of this patent is extended or adjusted under 35 U.S.C. 154(b) by 108 days.

(21) Appl. No.: 13/892,999

(22) Filed: May 13, 2013

(65) Prior Publication Data
US 2014/0334863 A1 Nov. 13, 2014

(51) Int. Cl.
| | |
|---|---|
| B43K 19/00 | (2006.01) |
| B43K 19/02 | (2006.01) |
| B43K 19/14 | (2006.01) |
| B43K 19/16 | (2006.01) |
| B43K 19/18 | (2006.01) |

(52) U.S. Cl.
CPC .............. *B43K 19/00* (2013.01); *B43K 19/02* (2013.01); *B43K 19/14* (2013.01); *B43K 19/16* (2013.01); *B43K 19/18* (2013.01)

(58) Field of Classification Search
USPC ............. 401/49, 50, 88, 195, 52; 264/171.11, 264/172.15, 173.11, 177.11
See application file for complete search history.

(56) References Cited

U.S. PATENT DOCUMENTS

| | | | | |
|---|---|---|---|---|
| 2,319,585 | A | * | 5/1943 | Chesler ........................ 401/96 |
| 2,988,784 | A | | 6/1961 | Lorenian |
| 3,520,834 | A | | 7/1970 | Mizutani et al. |
| 3,551,064 | A | | 12/1970 | Bartner |
| 3,704,071 | A | | 11/1972 | Muller et al. |
| 3,875,088 | A | * | 4/1975 | Arons et al. ................. 521/134 |
| 3,936,519 | A | * | 2/1976 | Crystal ........................ 264/46.1 |
| 3,993,408 | A | | 11/1976 | Arons et al. |
| 4,063,828 | A | | 12/1977 | Mukai et al. |
| 4,176,978 | A | | 12/1979 | Ruzicka et al. |
| 4,413,921 | A | * | 11/1983 | Fotiu et al. ...................... 401/96 |
| 5,244,297 | A | | 9/1993 | Bachelor et al. |
| 6,217,245 | B1 | * | 4/2001 | El-Fakir et al. .............. 401/195 |

* cited by examiner

Primary Examiner — David Walczak
(74) Attorney, Agent, or Firm — Michael I. Kroll

(57) ABSTRACT

A plastic pencil comprising a writing core, an interlayer coating material placed about the writing core, a porous casing enclosing the interlayer coating material on the writing core and a covering applied to the exterior surface of the porous casing.

5 Claims, 7 Drawing Sheets

16 — POROUS CASING

THE FOLLOWING MATERIALS ARE WEIGHED PER PREDETERMINED FORMULATION

TALCUM POWDER, CALCIUM SULFATE, CITRIC ACID, CALCIUM STEARATE, PIGMENT OR COLORING AGENT, LOW DENSITY POLYETHYLENE, THERMOPLASTIC ELASTOMER, ELVALOY®, ATACTIC POLYSTYRENE, AND FOAMING AGENT

FORMULATION IS MIXED USING A HIGH SPEED MIXER AND COMPOUNDED USING CO-ROTATING TWIN SCREW EXTRUDER. AND COMPOUNDED USING CO-ROTATING TWIN SCREW EXTRUDER

FORMULATION IS PELLETIZED INTO FREE FLOWING PELLETS, DRIED IN DEHUMIDIFIED AIR THEN FED INTO THE LEAD EXTRUDER BY A VACUUM LOADER.

FIG. 4

PROCESS AND FORMULATION FOR A PLASTIC PENCIL

BACKGROUND OF THE INVENTION

1. Field of the Invention

The present invention relates generally to pencils and, more specifically, to a process and formulation for a plastic pencil comprising a writing core, interlayer coating, a porous casing, coating and providing lining or striping on said coating.

2. Description of the Prior Art

There are other processes and formulations for producing pencils. While these formulations may be suitable for the purposes for which they where designed, they would not be as suitable for the purposes of the present invention as heretofore described.

It is thus desirable to provide a plastic pencil having a writing core and interlayer core housed within a porous casing having a coating that also provides for lining or striping on said coating.

It is further desirable to provide a plastic pencil having a formulation taken from the group of talcum powder, calcium carbonate, calcium stearate, low density polyethylene, palm oil, epoxy resin, styrene acrylonitrile and titanium dioxide and either graphite for black lead or coloring agent or pigment for colored lead.

SUMMARY OF THE PRESENT INVENTION

The present invention provides a plastic pencil comprising a writing core, a writing core coating, hereinafter referred to as the interlayer coating, a porous casing to enclose said writing core and said interlayer coating, a coating and lining or striping on the coating.

The writing core materials are weighed as per formulation and mixture of graphite (for black lead pencils) or color pigment or coloring agent (for color lead pencils), talcum powder, calcium carbonate, calcium stearate, low density polyethylene, palm oil, epoxy resin, styrene acrylonitrile and titanium dioxide is prepared as a batch. The batch is primarily mixed in a high speed mixer and compounded using co-rotating twin screw extruder and pelletized in form of free flowing pellets forming the writing core raw material.

The interlayer materials are a mixture of atactic polystyrene and Elvaloy®.

The casing materials are weighed as per formulation and a mixture of talcum powder, calcium sulfate, citric acid, calcium stearate, pigment or coloring agent, low density polyethylene, thermoplastic elastomer, Elvaloy®, atactic polystyrene and foaming agent is prepared in form of a batch. This batch is primarily mixed in a High speed mixer and compounded using co-rotating twin screw extruder and pelletized as free flowing pellets forming the raw material for the casing.

The coating and lining or striping materials is a mixture of atactic polystyrene and coloring agent.

The process of manufacturing the plastic pencils: comprises:

Drying the writing core formulation in a humidified air then automatically feeding the dried writing core into a lead extruder by vacuum loader;

Loading an interlayer extruder with the interlayer coating material formulation with both the lead extruder and interlayer extruder connected in a proprietary lead coating co-extrusion die-head;

Drying the casing material formulation in humidified air then automatically feeding the dried casing material into a casing extruder by vacuum loader;

Loading a coating extruder with the coating material formulation; and

Loading a lining extruder with striping or lining material formulation with the casing, coating and lining extruders connected to a proprietary pencil die-head.

The coating, lining, and casing extruders are initially started at a very low screw revolution. The material coming out of the pencil die-head is passed through a vacuum chamber consisting of pencil sizing unit and water cooling tank on the traction puller unit.

The lead and interlayer extruders are also started at a very low screw revolution. The lead along with the interlayer coating material is inserted into the pencil co-extrusion die-head.

The screw speeds of all the extruders are increased gradually until the desired size of the pencil is attained in the pencil sizing unit. The vacuum pump for the vacuum chamber is started and due to this vacuum the outer dimensions of the pencils are consistently maintained throughout the process of manufacturer.

The traction puller unit is fitted with a servo motor driven cutting system with an encoder measuring a predetermined length of pencil then signaling the servo motor, which engages the cutting system fly knife that continuously cuts pencils into a desired length with the cutting length being infinitely variable.

A primary object of the present invention is to provide a plastic pencil having a writing core, interlayer coating, a porous casing, coating and optionally providing lining or striping on said coating.

Another object of the present invention is to provide a plastic pencil having a writing core composition of talcum powder, calcium carbonate, calcium stearate, low density polyethylene, palm oil, epoxy resin, styrene acrylonitrile and titanium dioxide.

Yet another object of the present invention is to provide a writing core wherein said writing core composition further comprises graphite for a black writing core and color pigment or coloring agent for a colored writing core.

Still yet another object of the present invention is to provide a plastic pencil having an interlayer coating composition comprising atactic polystyrene and Elvaloy®.

An additional object of the present invention is to provide a plastic pencil wherein said interlayer core encompasses said writing core.

A further object of the present invention is to provide a plastic pencil having a porous casing composition of talcum powder, calcium sulfate, citric acid, calcium stearate, pigment or coloring agent, low density polyethylene, thermoplastic elastomer, Elvaloy®, atactic polystyrene and foaming agent.

A yet further object of the present invention is to provide a plastic pencil wherein said porous casing encompasses said interlayer coating and said writing core.

A still yet further object of the present invention is to provide a plastic pencil having a coating composition comprising atactic polystyrene and coloring agent.

Another object of the present invention is to provide a plastic pencil wherein said porous casing encompasses said interlayer coating and said writing core.

Yet another object of the present invention is to provide a plastic pencil having a lining or striping composition comprising atactic polystyrene and coloring agent and wherein said lining or striping is applied to said coating.

Additional objects of the present invention will appear as the description proceeds.

The present invention overcomes the shortcomings of the prior art by providing a process and formulation for a plastic pencil having a writing core, an interlayer coating encompassing said writing core, a porous casing encompassing said interlayer coating, a coating covering said porous casing and lining or striping on said coating.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 4 is a chart depicting the porous casing raw materials for the plastic pencil of the present invention.

DESCRIPTION OF THE REFERENCED NUMERALS

Figure 1:
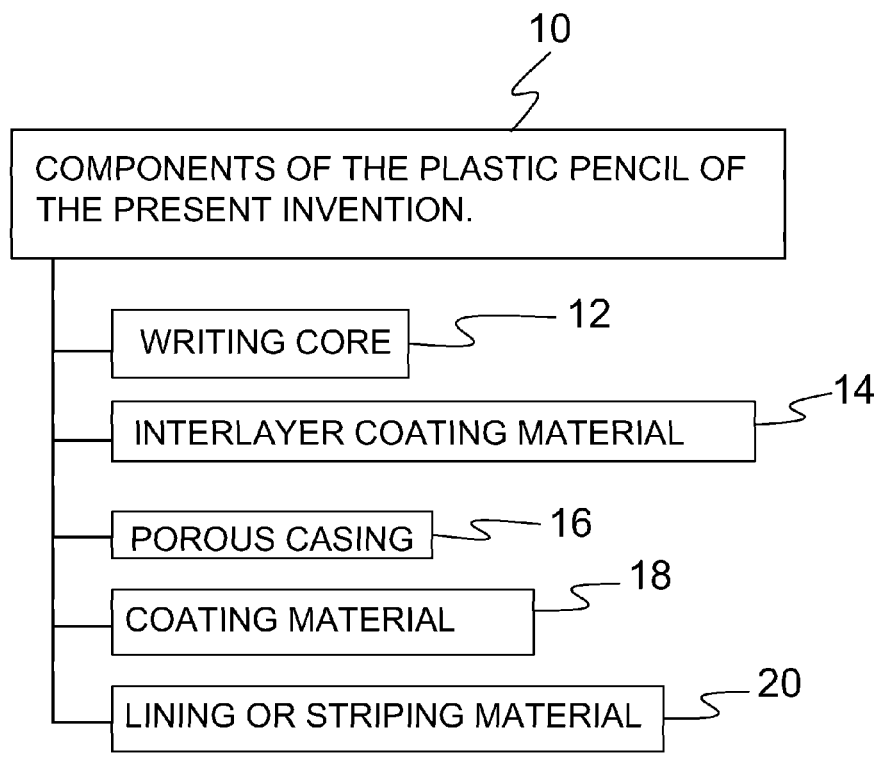
FIG. 1 is a chart of the components embodying the plastic pencil of the present invention.

Turning now descriptively to the drawings, in which similar reference characters denote similar elements throughout the several views, the Figures illustrate the plastic pencil of the present invention. With regard to the reference numerals used, the following numbering is used throughout the various drawing figures.

10 plastic pencil
12 writing core of plastic pencil 10
14 interlayer coating material of plastic pencil 10
16 porous casing of plastic pencil 10
18 coating material of plastic pencil 10
20 lining or striping material of plastic pencil 10

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is a chart of the components embodying the plastic pencil of the present invention. Shown are the constituent components formulated in the manufacturer of the plastic pencil 10 of the present invention.

Figure 2:
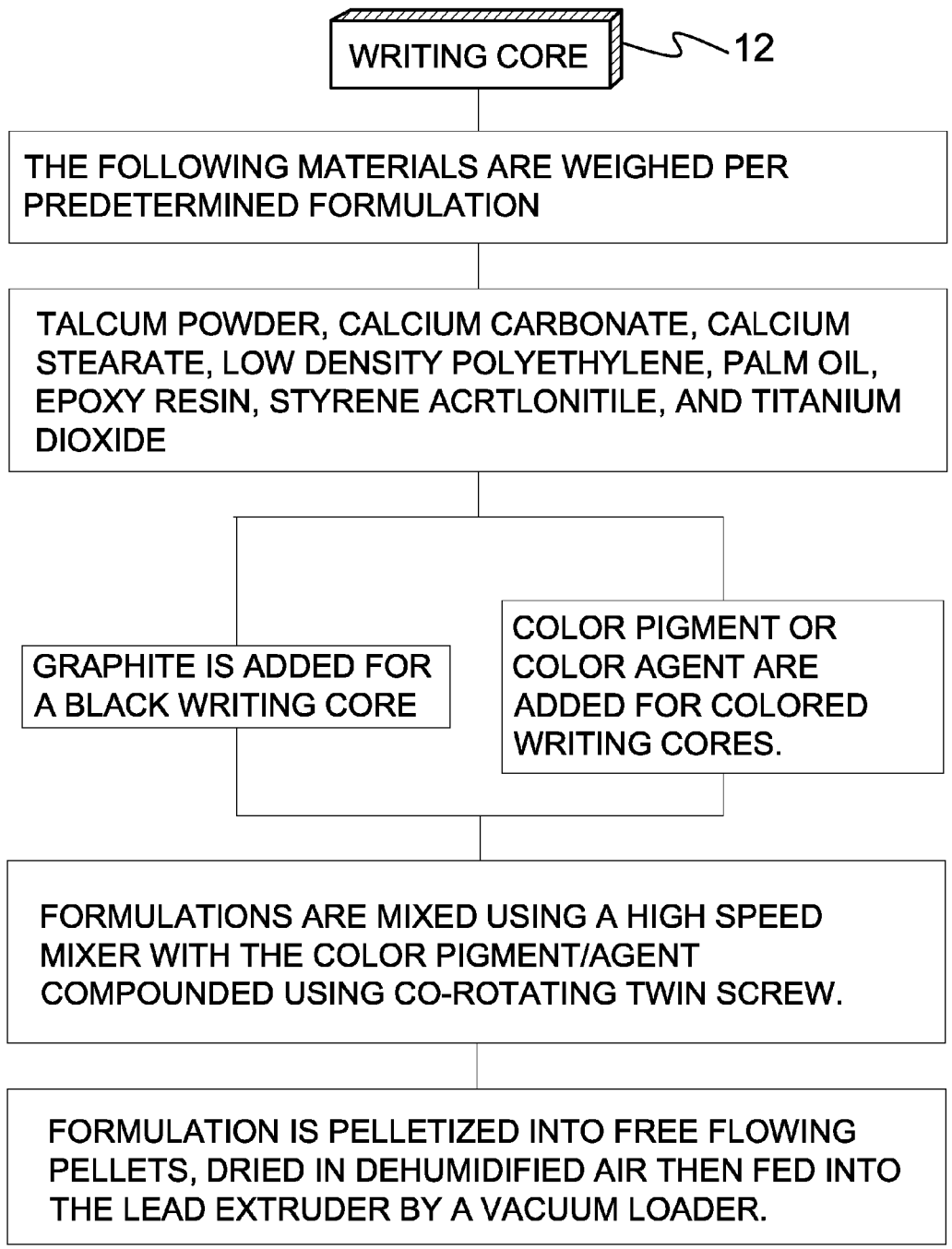
FIG. 2 is a chart depicting the writing core raw materials for the plastic pencil of the present invention.

Referring to FIG. 2, shown is a chart depicting the writing core raw materials for the plastic pencil of the present invention. The present invention provides a writing core 12 consisting of a formulation composition comprising 0.1%-15% by weight of talcum powder, 0.1%-15% by weight of calcium carbonate, 5%-25% by weight of calcium stearate, 0.1%-5% by weight of low density polyethylene, 0.1%-5% by weight of palm oil, 0.1%-15% by weight of epoxy resin, 0.10%-40% by weight of styrene acrylonitrile and 5%-25% by weight of titanium dioxide with 40%-80% by weight of graphite added for black lead and 5%-25% by weight of color pigment or coloring agent for colored lead which are mixed in a high speed mixture. The color core raw materials are further compounded using a co-rotating twin screw extruder where then the mixture is extruded and pelletized into free flowing pellets thereby forming the writing core 12.

Figure 3:
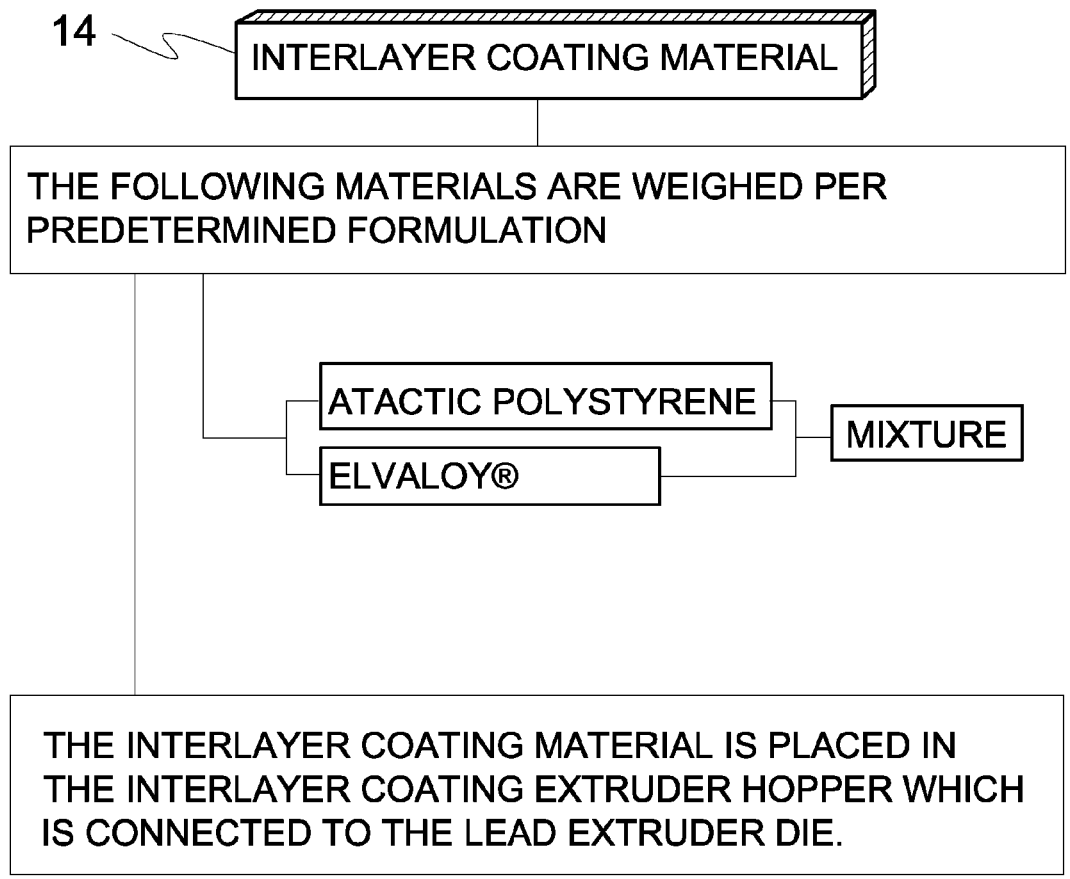
FIG. 3 is a chart depicting the interlayer materials for the plastic pencil of the present invention.

Referring to FIG. 3, shown is a chart depicting the interlayer coating of writing core raw materials for the plastic pencil of the present invention. The present invention provides an interlayer coating material 14 consisting of a formulation composition comprising 70-99% by weight of atactic polystyrene and 0.1-15% by weight of Elavloy®. The interlayer coating material 14 is placed in a hopper of an interlayer coating extruder. The interlayer coating extruder is connected to a lead extruder die.

Referring to FIG. 4, shown is a chart depicting the porous casing raw materials for the plastic pencil of the present invention. The present invention provides a porous casing 16 consisting of a formulation composition comprising 10%-30% by weight of talcum powder, 0.1%-5% by weight of calcium sulfate, 0.1%-5% by weight of citric acid, 0.1%-5% by weight of calcium stearate, 0.1%-5% by weight of pigment or coloring agent, 0.1%-15% by weight of low density polyethylene, 0.1%-10% by weight of thermoplastic elastomer, 0.1%-10% by weight of Elavloy®, 25%-75% by weight of atactic polystyrene and 0.1%-2% by weight of foaming agent, which are mixed in a high speed mixer and compounded using a co-rotating twin screw extruder where then the mixture is extruded and pelletized into free flowing pellets thereby forming the porous casing 16.

Figure 5:
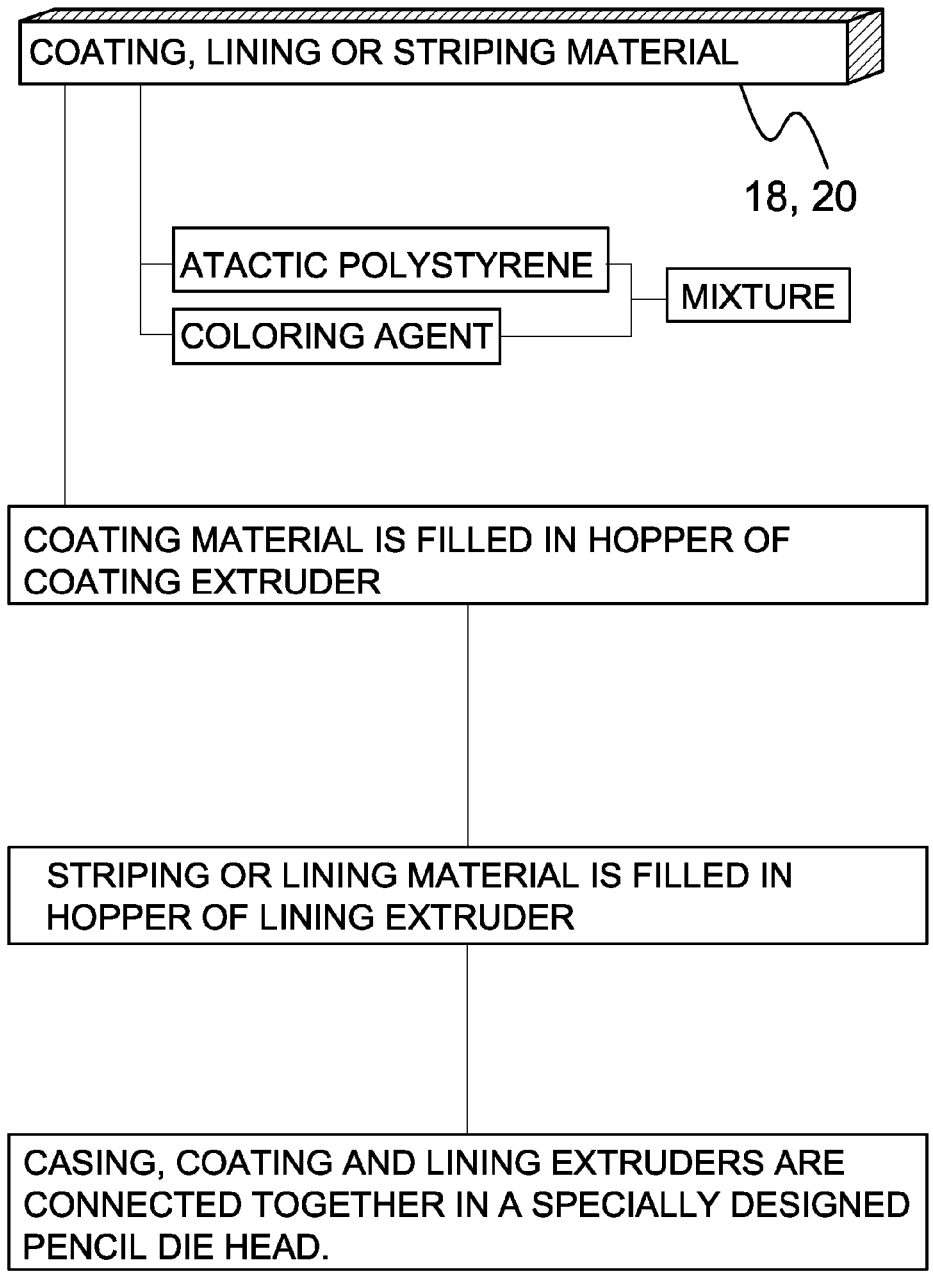
FIG. 5 is a chart depicting the coating, lining and striping raw materials for the plastic pencil of the present invention.

Referring to FIG. 5, shown is a chart depicting the coating, lining and striping raw materials for the plastic pencil of the present invention. The present invention provides a coating material 18 and a lining material or a striping material 20 consisting of a formulation composition comprising 70%-99% by weight of atactic polystyrene and 0.1%-15% by weight of coloring agent. The coating material 18 is placed in a hopper of a coating extruder and the lining material or striping material 20 are placed in the lining or striping extruder hopper. The casing, coating and lining extruders are connected together in a specially designed pencil die head.

Figure 6:
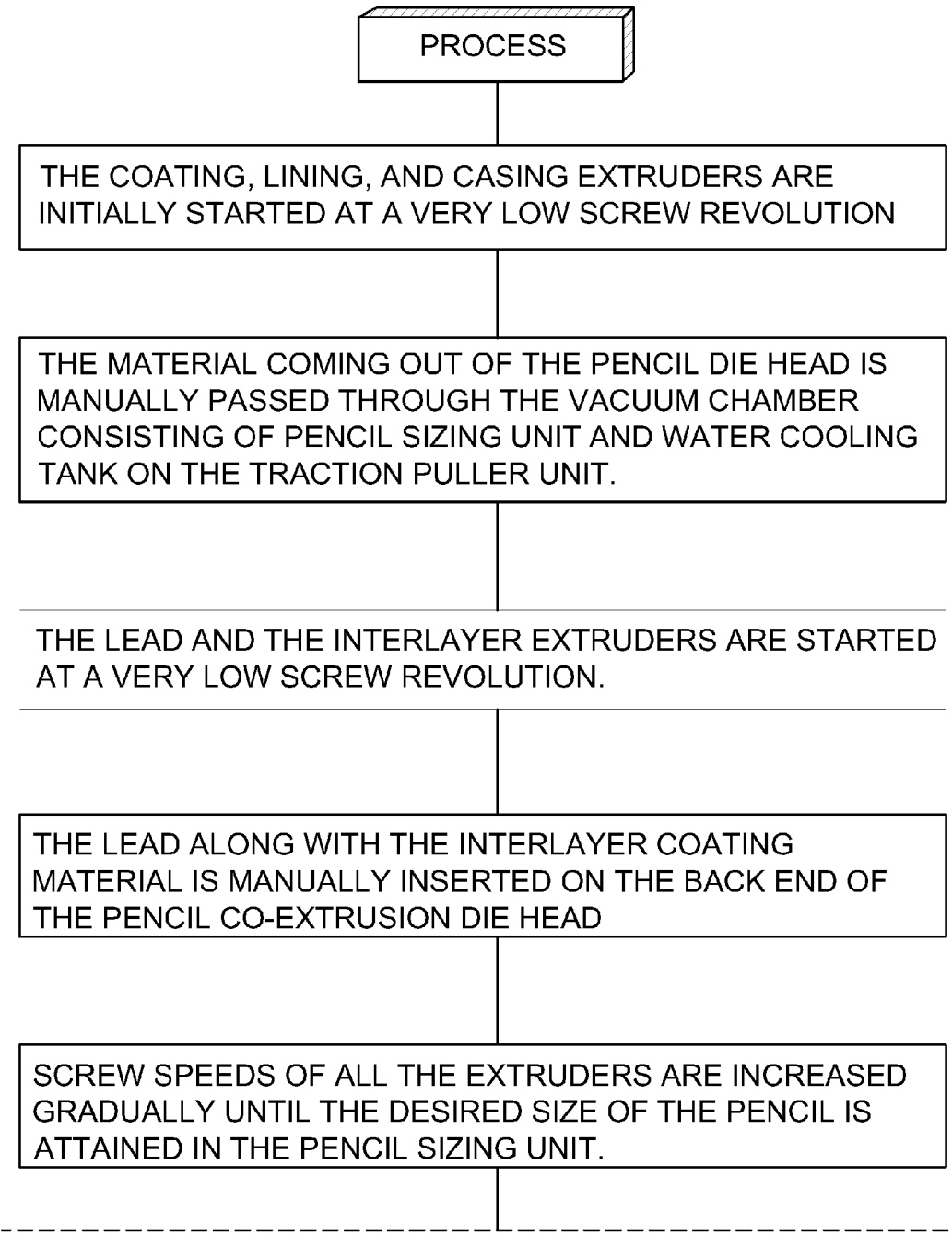
FIG. 6 is a chart of the manufacturing process for the plastic pencil of the present invention.
Figure 7:
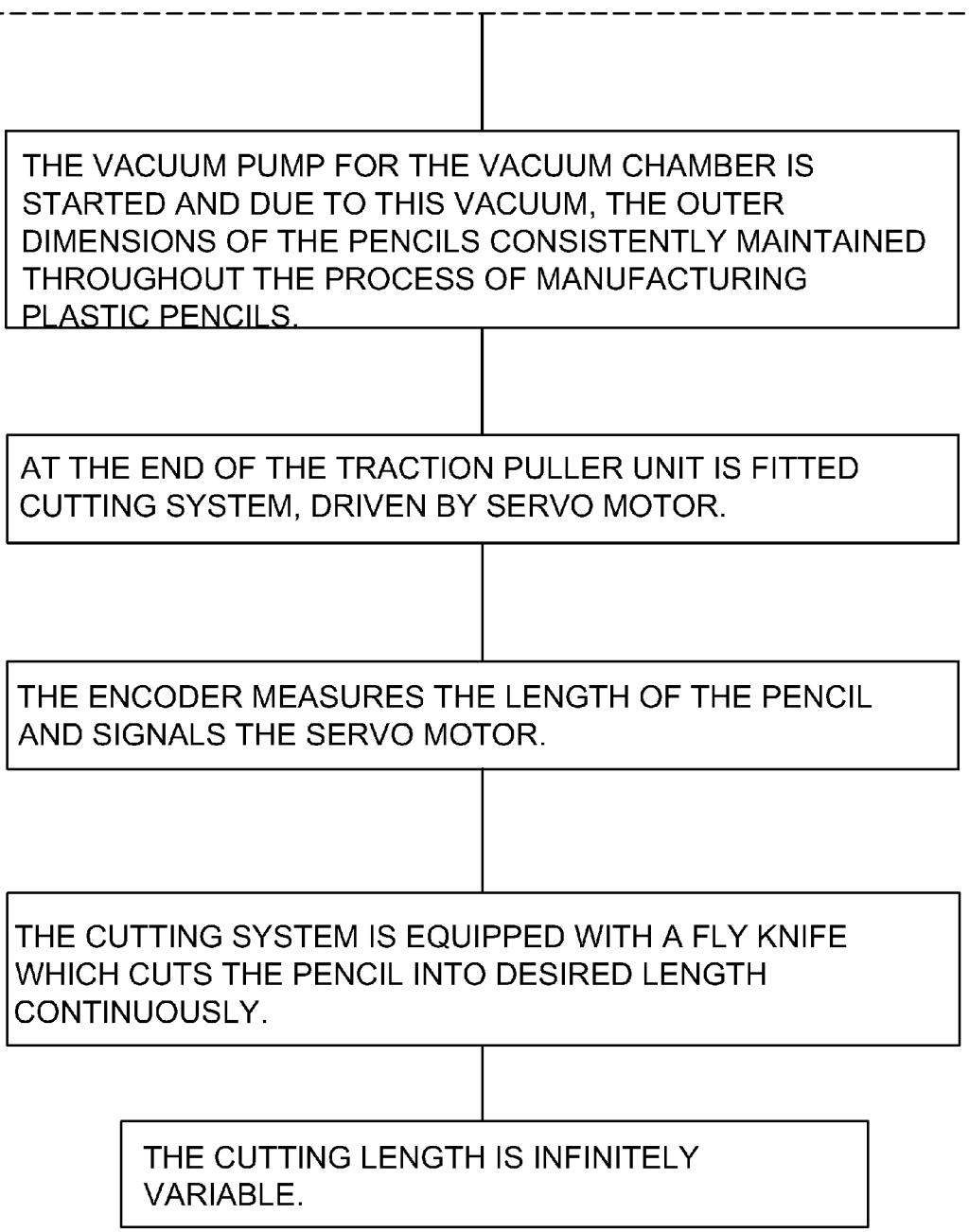
FIG. 7 is a chart depicting the continuation of the manufacturing process for the plastic pencil of the present invention.

Referring to FIG. 6 and FIG. 7, shown is the manufacturing process comprising the steps of: Drying the writing core 12 formulation in a humidified air then automatically feeding the dried writing core 12 into a lead extruder by a vacuum loader; Loading an interlayer extruder with the interlayer coating material 14 formulation with both the lead extruder and the interlayer extruder connected in a proprietary lead coating co-extrusion die-head; Drying the porous casing 16 material formulation in humidified air then automatically feeding the dried porous casing 16 material into a casing extruder by the vacuum loader. Loading a coating extruder with the coating material 18 formulation and loading a lining extruder with the lining material or striping formulation 20 with the casing, coating and lining extruders connected to a proprietary pencil die-head.

The coating, lining, and casing extruders are initially started at a very low screw revolution. The material coming out of the pencil die-head is passed through a vacuum chamber consisting of pencil sizing unit and water cooling tank (coupled with a chamber tank unit). The water is maintained at −10 degrees Celsius. The lead and interlayer extruders are also started at a very low screw revolution. The lead along with the interlayer coating material 14 is inserted into the pencil co-extrusion die-head.

The screw speeds of all the extruders are increased gradually until the desired size of the pencil is attained in the pencil sizing unit. The vacuum pump for the vacuum chamber is started and due to this vacuum the outer dimensions of the pencils are consistently maintained throughout the process of manufacturer.

The traction puller unit is fitted with a servo motor driven cutting system with an encoder measuring a predetermined length of pencil then signaling the servo motor, which engages the cutting system fly knife that continuously cuts pencils into a desired length with the cutting length being infinitely variable.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A plastic pencil comprising:
   a) a writing core;
   b) an interlayer coating material placed about the writing core;
   c) a porous casing enclosing the interlayer coating material on the writing core;
   d) a coating applied to the exterior surface of the porous casing;
   e) a lining applied on the coating of the porous casing; and
   f) wherein the writing core consists of a formulation composition comprising 0.1%-15% by weight of talcum powder, 0.1%-15% by weight of calcium carbonate, 5%-25% by weight of calcium stearate, 0.1%-5% by weight of low density polyethylene, 0.1%-5% by weight of palm oil, 0.1%-15% by weight of epoxy resin, 0.10%-40% by weight of styrene acrylonitrile and 5%-25% by weight of titanium dioxide with 40%-80% by weight of graphite added for black lead and 5%-25% by weight of color pigment/coloring agent for colored lead which are mixed in a high speed mixture, whereby the color core raw materials are further compounded using a co-rotating twin screw extruder where then the mixture is extruded and pelletized into free flowing pellets thereby forming the writing core.

2. A process for manufacturing a plastic pencil comprising the steps of:
   a) drying a writing core formulation in a humidified air then automatically feeding the dried writing core into a lead extruder by a vacuum loader;
   b) loading an interlayer extruder with an interlayer coating material formulation with both the lead extruder and the interlayer extruder connected in a proprietary lead coating co-extrusion die-head;
   c) drying a porous casing material formulation in humidified air then automatically feeding the dried porous casing material into a casing extruder by the vacuum loader;
   d) loading a coating extruder with a coating material formulation; and
   e) loading a lining extruder with a lining material and a striping material formulation with the casing, coating and lining extruders connected to the proprietary pencil die-head.

3. A plastic pencil comprising:
   a) a writing core;
   b) an interlayer coating material placed about the writing core;
   c) a porous casing enclosing the interlayer coating material on the writing core;
   d) a coating applied to the exterior surface of the porous casing;
   e) a lining applied on the coating material of the porous casing; and
   f) wherein the interlayer coating material consists of a formulation composition comprising 70-99% by weight of atactic polystyrene and 0.1-15% by weight of Elavloy®, whereby the interlayer coating material is placed in a hopper of an interlayer coating extruder, in which the interlayer coating extruder is connected to a lead extruder die.

4. A plastic pencil comprising:
   a) a writing core;
   b) an interlayer coating material placed about the writing core;
   c) a porous casing enclosing the interlayer coating material on the writing core;
   d) a coating applied to the exterior surface of the porous casing;
   e) a lining or striping material applied on the coating of the porous casing; and
   f) wherein the porous casing consists of a formulation composition comprising 10%-30% by weight of talcum powder, 0.1%-5% by weight of calcium sulfate, 0.1%-5% by weight of citric acid, 0.1%-5% by weight of calcium stearate, 0.1%-5% by weight of pigment or coloring agent, 0.1%-15% by weight of low density polyethylene, 0.1%-10% by weight of thermoplastic elastomer, 0.1%-10% by weight of Elavloy®, 25%-75% by weight of atactic polystyrene and 0.1%-2% by weight of foaming agent, which are mixed in a high speed mixer and compounded using a co-rotating twin screw extruder where then the mixture is extruded and pelletized into free flowing pellets thereby forming the porous casing.

5. The plastic pencil as recited in claim 4, wherein the, lining material or striping material consist of a formulation composition comprising 70%-99% by weight of atactic polystyrene and 0.1%-15% by weight of coloring agent, whereby the coating material is placed in a hopper of a coating extruder and the lining material and striping material are placed in a lining extruder hopper, in which the casing, coating and lining extruders are connected together in a specially designed pencil die head.

* * * * *